Patented Apr. 25, 1939

2,156,254

UNITED STATES PATENT OFFICE 2,156,254

THERAPEUTIC COMPOSITION

Lessel L. Manchey, New York, N. Y., assignor to Piedmont Development Corporation, Wilmington, Del., a corporation of Delaware No Drawing. Application October 29, 1937, Serial No. 171,643

5 Claims. (Cl. 167—58)

This invention relates to new compositions adapted for use as nose drops or nasal sprays in the treatment of head colds and the like. It relates more particularly to new compositions for this purpose having an aqueous base and containing a suitable vaso-constricting agent or agents, local anaesthetics, analgesics, aromatic materials, etc., and, in addition to such conventional constituents, a small amount of methyl cellulose to give a controlled increase in viscosity. The nature of the compositions is such that they have a viscosity which does not change greatly in the temperature range from about 40° F. to about 100° F., and the compositions have a relatively high viscosity at nasal temperatures such that they spread readily over the surface of the mucous membranes on contact and remain in contact with them, while at lower temperatures their viscosity is not so great as to preclude ready administration with a dropping device or spray.

It has heretofore been proposed to prepare nose drops or sprays in the form of aqueous solutions of vaso-constricting agents such as water-soluble salts of ephedrine, epinephrine and other vaso-constrictor amines, together with other materials such as suitable antiseptics, aromatic materials, analgesics, local anaesthetics, etc.; but in general these compositions are subject to serious disadvantages in that their viscosity is such that they do not spread effectively over the surfaces of the mucous membranes on contact, nor remain in contact with them for a sufficient period of time to perform their function effectively.

In accordance with the present invention, compositions adapted for use as nose drops or sprays are provided which have an aqueous base, and which contain, in addition to more or less conventional ingredients, a relatively small amount of methyl cellulose. The methyl cellulose, in the quantities used, has the property of increasing the viscosity of the compositions at nasal temperatures to an extent such that the compositions readily spread upon contact with the mucous membranes and remain in contact with them, thus having increased therapeutic efficiency, without increasing the viscosity at room temperatures or temperatures below room temperature, e. g., as low as 40° F., to such an extent as to cause the compositions to gel or to preclude their ready administration with spray or dropping devices. It is an important advantage of methyl cellulose that the change in viscosity of such aqueous compositions, with temperature, at least in the temperature range of from about 40° F. to about 100° F., is not particularly great, so that an aqueous solution suitable for use as a nasal spray or nose drop having a relative viscosity, at nasal temperatures, of about 4 to 5, as compared to water, as determined by the use of a Dudley pipette, is still sufficiently fluid at temperatures down as low as 40° F. to be readily administered. While the viscosity of the compositions both at nasal temperatures and lower temperatures may be varied over relatively wide ranges, I have found it advantageous to use an amount of methyl cellulose which will impart a relative viscosity at nasal temperatures of about 4 to about 5, as determined by the Dudley pipette, the relatively uniform viscosity over the temperature range of about 40° F. to 100° F. insuring a sufficiently low viscosity at lower temperatures to permit ready administration.

Methyl cellulose has the further advantages that it is very stable in the presence of water and other ingredients used in nose drops and nasal sprays, even under slightly acid or alkaline conditions and is compatible with the other constituents of the compositions. Further, it is extremely resistant to putrefactive and fermentative changes, and need not be used in large concentrations such as might result in the deposition of objectionable residues in the nasal passages. It is non-irritating.

In general, the amount of methyl cellulose which may be used with advantage is from about 2.5 to about 3% of the total composition; such amount of methyl cellulose, when incorporated in the aqueous base, increasing the relative viscosity of the compositions at nasal temperatures to about 4 to 5 as determined by the Dudley pipette and resulting in a composition which has a relatively uniform viscosity over the temperature range from about 40° F. to about 100° F. and is sufficiently fluid at the lower temperatures to permit ready administration. It will be appreciated that the amount of methyl cellulose used must be varied to make allowance for variations in properties of the methyl cellulose, as certain methyl celluloses produce the desired increase in viscosity in lesser amounts than others. In any case, it is a simple matter to determine how much of a particular grade or batch must be used to produce the desired increase in viscosity.

The invention will be further illustrated by the following specific example, but it is not limited thereto:

An aqueous solution containing about 1% of ephedrine sulfate, 0.5% of chlorbutanol, 0.85% of sodium chloride and from 2.5 to 3% of methyl cellulose is prepared. The resulting composition is approximately isotonic and has a sufficiently high relative viscosity, i. e., about 4 to 5 as measured by the Dudley pipette, at nasal temperatures so that it spreads readily upon contact with the mucous membranes and remains in contact with them, thus being highly effective for the treatment of head colds and the like. At the same time, its viscosity at lower temperatures, e. g., down to 40° F. is sufficiently low so that it can be readily administered with nose droppers or sprays. If desired, one or more of the aromatics, such as thymol, menthol, eucalpytol, etc., may be added up to saturation to make the composition more pleasant when administered.

The ephedrine sulfate in the composition of the example is a vaso-constricting agent, and is the therapeutically effective ingredient. It may, of course, be replaced by other salts of ephedrine, such as the hydrochloride, or by other suitable water soluble vaso-constricting agents of the same general nature such as water soluble salts of epinephrine, phenyl and hydroxyphenyl propanol amines, phenyl and hydroxyphenyl ethanol amines, etc. The chlorbutanol is an analgesic, local anaesthetic and antiseptic, and may be omitted or replaced by other suitable analgesics, local anaesthetics or antiseptics. If desired, the compositions may be varied by the inclusion of other ingredients, the present invention being directed to the use of the methyl cellulose for the proper control of the viscosity of the aqueous base compositions at nasal and lower temperatures.

I claim:

1. An aqueous composition adapted for use as nose drops or nasal sprays including, in addition to therapeutic ingredients, a small amount of methyl cellulose.

2. An aqueous composition adapted for use as nose drops or nasal sprays containing a vaso-constricting agent and a small amount of methyl cellulose.

3. An aqueous composition adapted for use as nose drops or nasal sprays containing a salt of ephedrine and a small amount of methyl cellulose.

4. An aqueous composition adapted for use as nose drops or nasal sprays including, in addition to therapeutic ingredients, from about 2½% to about 3% of methyl cellulose.

5. An aqueous composition adapted for use as nose drops or nasal sprays including, in addition to therapeutic ingredients, a quantity of methyl cellulose sufficient to impart a relative viscosity, as measured by the Dudley pipette, of from about 4 to about 5 at nasal temperatures.

LESSEL L. MANCHEY.